(12) United States Patent
Lee et al.

(10) Patent No.: US 8,478,498 B2
(45) Date of Patent: Jul. 2, 2013

(54) ENGINE POWER MANAGEMENT FOR A SELECTABLE ONE-WAY CLUTCH OR MECHANICAL DIODE IN AUTOMATIC TRANSMISSIONS

(75) Inventors: Chunhao J. Lee, Troy, MI (US); Farzad Samie, Franklin, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1331 days.

(21) Appl. No.: 12/206,853

(22) Filed: Sep. 9, 2008

(65) Prior Publication Data

US 2010/0063694 A1 Mar. 11, 2010

(51) Int. Cl.
G06F 17/00 (2006.01)

(52) U.S. Cl.
USPC .................. 701/67; 701/54; 475/43

(58) Field of Classification Search
USPC ............... 701/67, 54; 475/43; 477/107, 70, 477/115, 116; 192/43.1, 45.1
See application file for complete search history.

(56) References Cited

U.S. PATENT DOCUMENTS

| | | | | | |
|---|---|---|---|---|---|
| 4,576,063 | A | * | 3/1986 | Akashi et al. | 74/745 |
| 4,875,391 | A | * | 10/1989 | Leising et al. | 477/155 |
| 7,198,587 | B2 | * | 4/2007 | Samie et al. | 475/285 |
| 7,676,315 | B2 | * | 3/2010 | Doering et al. | 701/87 |
| 8,029,403 | B2 | * | 10/2011 | Lee et al. | 475/276 |
| 8,306,709 | B2 | * | 11/2012 | Lee et al. | 701/54 |
| 2003/0119623 | A1 | * | 6/2003 | Stevenson et al. | 475/275 |
| 2004/0235608 | A1 | * | 11/2004 | Borgerson et al. | 475/275 |
| 2005/0130789 | A1 | * | 6/2005 | Samie et al. | 475/284 |
| 2007/0099758 | A1 | * | 5/2007 | Maguire et al. | 477/175 |
| 2008/0149067 | A1 | | 6/2008 | Kimes | |
| 2008/0168964 | A1 | * | 7/2008 | Kimura et al. | 123/325 |
| 2008/0169165 | A1 | | 7/2008 | Samie et al. | |
| 2008/0223681 | A1 | * | 9/2008 | Stevenson et al. | 192/43 |
| 2008/0300093 | A1 | * | 12/2008 | Borgerson | 475/276 |
| 2009/0084653 | A1 | * | 4/2009 | Holmes | 192/41 A |
| 2009/0143180 | A1 | * | 6/2009 | Shimizu et al. | 475/127 |
| 2009/0194381 | A1 | * | 8/2009 | Samie et al. | 192/43.2 |
| 2009/0211863 | A1 | * | 8/2009 | Kimes | 192/43.1 |
| 2009/0233761 | A1 | * | 9/2009 | Dickinson | 477/77 |
| 2010/0018795 | A1 | * | 1/2010 | Samie et al. | 180/383 |
| 2010/0022342 | A1 | * | 1/2010 | Samie et al. | 475/144 |
| 2010/0022343 | A1 | * | 1/2010 | Samie et al. | 475/148 |
| 2010/0063693 | A1 | * | 3/2010 | Lee et al. | 701/54 |
| 2010/0063694 | A1 | * | 3/2010 | Lee et al. | 701/54 |
| 2010/0063698 | A1 | * | 3/2010 | Lee et al. | 701/67 |

(Continued)

OTHER PUBLICATIONS

U.S. Appl. No. 12/206,841, Lee et al.

(Continued)

*Primary Examiner* — John Q Nguyen
*Assistant Examiner* — Brian J Broadhead

(57) ABSTRACT

A method for controlling a powertrain includes monitoring engagement status of said selectable one-way clutch, monitoring an upshift command, monitoring a speed of an engine to torque converter shaft, monitoring a speed of a torque converter to transmission shaft, when the monitoring detects engagement of the selectable one-way clutch and the upshift command, then determining a relative rotational speed of the torque converter based upon the speed of said engine to torque converter shaft and the speed of said torque converter to transmission shaft. A locked selectable one-way clutch condition is diagnosed based upon the relative rotational speed. A torque increase is commanded from the engine based upon the locked selectable one-way clutch condition. And disengagement of the selectable one-way clutch is commanded.

12 Claims, 7 Drawing Sheets

U.S. PATENT DOCUMENTS

| | | | |
|---|---|---|---|
| 2010/0105521 A1* | 4/2010 | Kondo et al. | 477/115 |
| 2010/0197457 A1* | 8/2010 | Kuwahara et al. | 477/107 |
| 2010/0234167 A1* | 9/2010 | Lee et al. | 475/285 |
| 2010/0317487 A1* | 12/2010 | Cullen et al. | 477/107 |
| 2011/0011694 A1* | 1/2011 | Swales et al. | 192/48.2 |
| 2011/0238275 A1* | 9/2011 | Watanabe et al. | 701/67 |

OTHER PUBLICATIONS

U.S. Appl. No. 12/206,847, Lee et al.

Samie, F., Lee., C. J., and Pawley, B., Selectable One-Way Clutch in GM RWD Six-Speed Automatic Transmission, SAE 2009-01-0509.

* cited by examiner

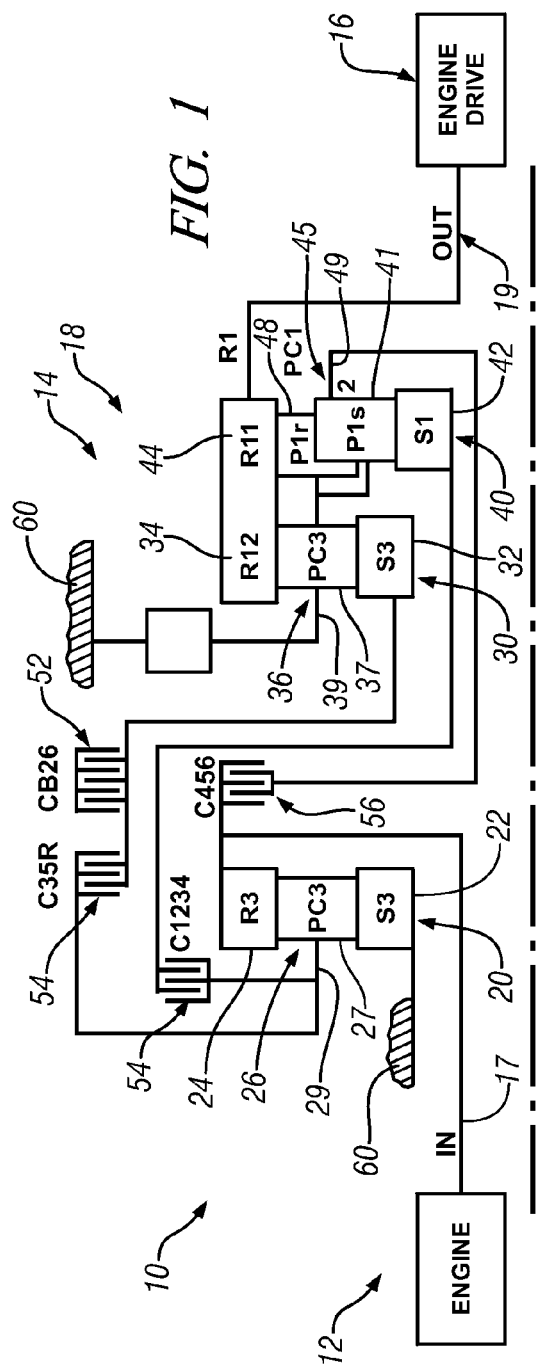

ENGINE POWER MANAGEMENT FOR A SELECTABLE ONE-WAY CLUTCH OR MECHANICAL DIODE IN AUTOMATIC TRANSMISSIONS

TECHNICAL FIELD

This disclosure is related to a transmission having a selectable one-way clutch.

BACKGROUND

The statements in this section merely provide background information related to the present disclosure and may not constitute prior art.

The present disclosure relates to a transmission within a vehicular powertrain having a selectable one-way clutch used to selectively transfer torque from an input member to an output member. One potential embodiment includes a selectable one-way clutch, utilized in combination with rotating input clutches that are slipped for engagement in forward and reverse. Clutch engagements can be performed in by a number of known methods. In a friction clutch engagement configuration, one or more clutches inside the transmission are slipped and gradually engaged to gradually transfer torque from the engine into the transmission for launch. In a frictionless clutch engagement configuration, clutch engagement occurs without clutch slip, requiring that the clutch be synchronized before engagement occurs.

A transmission operates in one of a plurality of transmission gear states, defining the direction of torque applied to the output member and a gear ratio describing the relationship of torque applied to the input member to the output member. An exemplary transmission includes eight transmission gear states comprising six forward gears, a reverse gear, and a neutral gear state.

A vehicle powertrain equipped with an automatic transmission can include a torque converter positioned between the engine and the transmission. In the alternative, a flywheel and isolator configuration can be used between the engine and the transmission. Some automatic transmissions include a low/reverse braking clutch and a one way clutch to provide reaction torque in both forward and reverse directions as input clutches are slipped for launching the vehicle without a torque converter.

One-way clutches are used in numerous applications to selectively transmit power from a first rotatable driving member or input member such as an input race or first coupling plate, to a second independent driven member or output member such as an output race or second coupling plate. In application, the clutch transmits torque when the rotation of the driving member with respect to the driven member is in a first direction. When the relative rotational direction of the driving member with respect to the driven member is in an opposite or second direction, the clutch will release or decouple the driving member from the driven member. Once released, the driving member is free to rotate in the second opposite direction relative to the driven member. In this mode, the one-way clutch is free to overrun or "freewheel". Freewheeling enables the vehicle to travel in a coasting movement, with the drivetrain decoupled from the engine, thereby eliminating losses associated with the drivetrain turning the engine.

Engine braking is an operation whereby torque to the driving member is reduced, a coupled connection between the driving member and the driven member is maintained, and back-torque as a result of turning an engine with reduced power applied and pumping forces in the engine is transmitted through the connection with a result of slowing the driven member. Freewheeling of a one-way clutch decouples the driving member and the driven member inconsistent with operation of engine braking. Engine braking in a vehicle equipped with a one-way clutch operating as described above requires additional components, for example, an additional clutch to selectively couple the driving member and the driven member, to accomplish engine braking.

In an exemplary front wheel drive, six speed automatic vehicle transmission, using a three gear set and five torque transmitting element (clutch) arrangement, one of the clutches, henceforth referred to as the low and reverse clutch, is only applied in manual low and in reverse. In first gear in the drive mode, the low and reverse clutch is disengaged. There is no relative motion between the input and output components of the low and reverse clutch because a reaction torque acting on a one-way clutch, to which the input components of the low and reverse clutch are connected, prevents rotation. However, in all other forward gears, second through sixth in the drive mode, there is no reaction torque acting on the one-way clutch as a result of one or more other clutches in the transmission being applied. Consequently, the one-way clutch freewheels and relative motion between the low and reverse clutch components is present. The relative speed between the input and output components of the low and reverse clutch increases with each successive gear change.

As is commonly known to those familiar with the art, disengaged multi-plate clutches, depending on various conditions, produce drag when there is relative motion between the input and the output members. One characteristic of a disengaged multi-plate clutch is that, as the relative speed between the input and output members increases, typically, so does the drag or spin loss. This spin loss contributes to decreased fuel economy. Since the low and reverse clutch is disengaged in all of the forward gears of the described exemplary six speed automatic transmission with this particular gear set and clutch arrangement, and since most of the transmission's operating mode is in the forward gear ratios, a measurable amount of the overall spin losses in the transmission can be attributed to the drag in the disengaged low and reverse clutch.

A selectable one-way clutch (SOWC) is similar to a one-way clutch in basic operation. However, depending on the details of the design, an SOWC is capable of producing a mechanical connection between a driving and a driven member in one or both rotational directions. Also, depending on the design, an SOWC is capable of overrunning in one or both directions of rotation. Typically, a SOWC contains an externally controllable selection mechanism, that when moved to a second, and possibly even a third position, controls the operating modes of the device. An SOWC, replacing a one-way clutch and a low and reverse clutch configuration as described above, reduces the part complexity of the transmission, reduces weight and cost of the transmission, and reduces overall spin losses.

The ability of the driving member of a SOWC to transmit torque to a driven member depends on whether or not the engaging torque transmitting elements of the SOWC, typically rollers, sprags, rockers, or struts, etc., are able to freely engage one or more cams, notches, recesses, or similar features in the adjacent member. Similarly, the ability of the driving member to freewheel in one or both directions with respect to the driven member also depends on whether or not the engaging elements are free to interact with the adjacent member. Typically, a rotatable retainer ring or selector plate is used to accomplish this task by allowing or restricting engagement of the torque transmitting elements between the driving and the driven member. Other similar clutch designs are known in the art and capable of use as one-way clutching devices, including synchronizers and dog clutches. A number of clutch designs capable of functioning as an SOWC are envisioned, and this disclosure is not intended to be limited to the particular exemplary embodiments described herein.

Depending on the application, an SOWC can be designed to operate in two modes or three modes. This disclosure will focus on a two mode SOWC. In particular, this disclosure will reference an SOWC enabling a first, disengaged mode and a second, engaged mode. The disengaged mode includes operation of the SOWC as a one-way clutch, as described above, allowing transmission of torque in a forward direction and freewheeling in the reverse direction. The engaged mode includes locking the clutch, preventing relative rotation of the driving member in either direction. In the engaged mode, the clutch allows transmission of torque in forward and reverse directions. Selection between the two modes includes actuation of a selection mechanism, for example, rotating a retaining ring or selector plate, henceforth simply referred to as a selector plate, between annular positions.

Operating a transmission equipped with an SOWC, configured as described above, frequently requires that an engaged SOWC be disengaged before an upshift from an initial gear can occur. However, a vehicle undergoing engine braking can experience a locked SOWC condition, wherein the torque transmitted through the SOWC can prevent disengagement of the SOWC. A method to facilitate disengagement of the SOWC by eliminating the locked SOWC condition would be beneficial.

SUMMARY

A powertrain in a vehicle includes an electromechanical transmission including a frictionless engagement selectable one-way clutch mechanically-operatively coupled to an internal combustion engine adapted to selectively transmit mechanical power to an output member and a torque converter. A method for controlling the powertrain includes monitoring engagement status of said selectable one-way clutch, monitoring an upshift command, monitoring a speed of an engine to torque converter shaft, monitoring a speed of a torque converter to transmission shaft, when the monitoring detects engagement of the selectable one-way clutch and the upshift command, then determining a relative rotational speed of the torque converter based upon the speed of said engine to torque converter shaft and the speed of said torque converter to transmission shaft. A locked selectable one-way clutch condition is diagnosed based upon the relative rotational speed. A torque increase is commanded from the engine based upon the locked selectable one-way clutch condition. And disengagement of the selectable one-way clutch is commanded.

BRIEF DESCRIPTION OF THE DRAWINGS

One or more embodiments will now be described, by way of example, with reference to the accompanying drawings, in which:

FIG. 1 schematically illustrates a stick diagram of an exemplary powertrain 10, in accordance with the present disclosure;

FIG. 2 is an exemplary clutching table, describing operation of various clutches in an exemplary transmission to accomplish various transmission gear states, in accordance with the present disclosure;

FIG. 4 illustrates SOWC feature 100 with one engagement element in a down position and one engagement element in an up position, in accordance with the present disclosure;

FIG. 5 illustrates SOWC feature 100 with both engagement elements in an up position, in accordance with the present disclosure;

DETAILED DESCRIPTION

Figure 3:
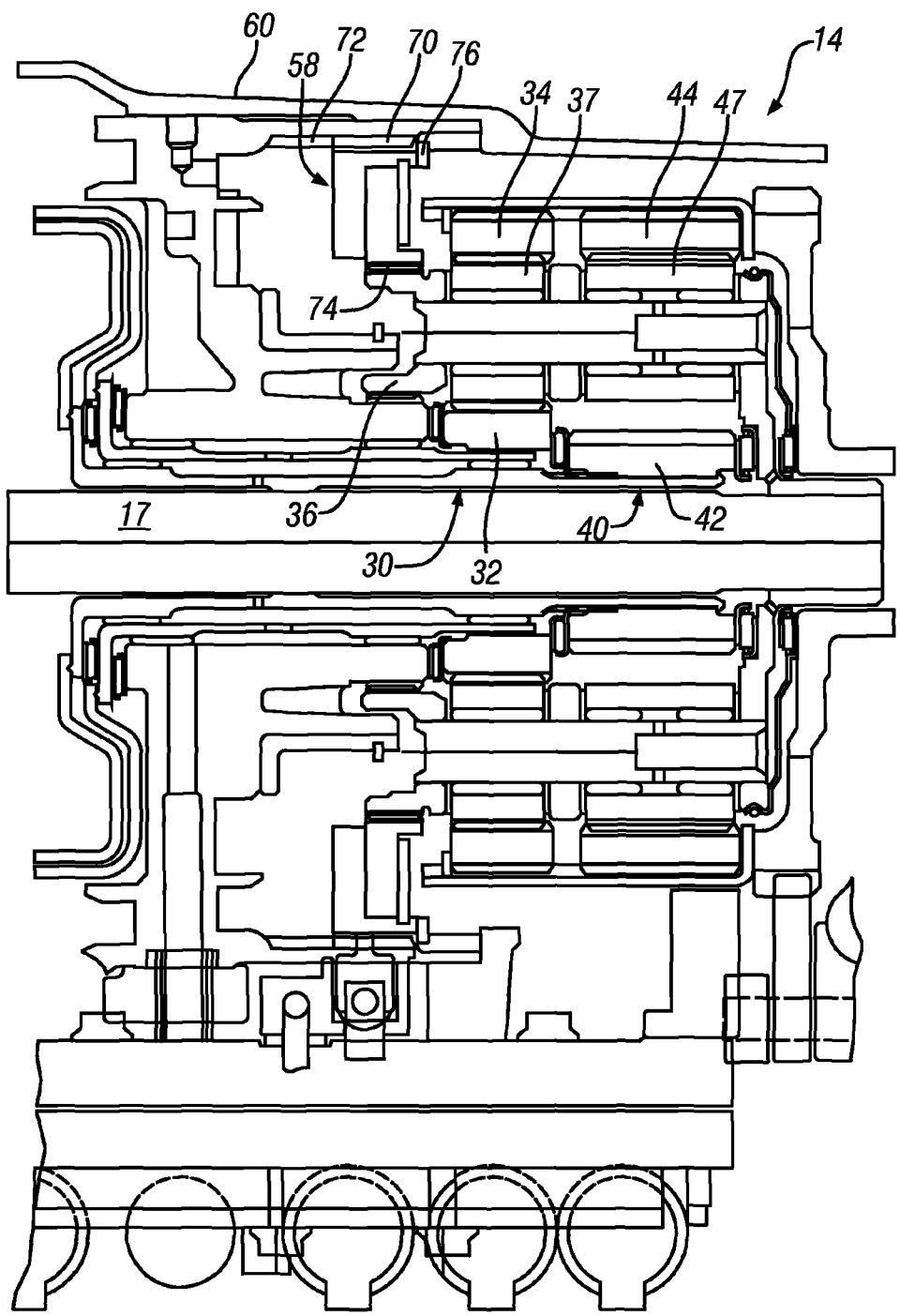
FIG. 3 is a schematic partial cross-sectional view of an exemplary transmission utilizing an SOWC, in accordance with the present disclosure.

Referring now to the drawings, wherein the showings are for the purpose of illustrating certain exemplary embodiments only and not for the purpose of limiting the same, FIG. 1 schematically illustrates a stick diagram of an exemplary powertrain 10, in accordance with the present disclosure. The powertrain includes an engine 12, a planetary transmission 14, and a conventional final drive mechanism 16.

The planetary transmission 14 includes an input shaft 17 continuously connected with the engine 12, a planetary gear arrangement 18, and an output shaft 19 continuously connected with the final drive mechanism 16. A torque converter may be positioned between the engine 12 and the input shaft 17. If no torque converter is present, then an isolator would be positioned between the engine 12 and the input shaft 17. The planetary gear arrangement 18 includes three planetary gear sets 20, 30 and 40.

The first planetary gear set 20 includes a sun gear member 22, a ring gear member 24, and a planet carrier assembly member 26. The planet carrier assembly member 26 includes a plurality of pinion gears 27 rotatably mounted on a carrier member 29 and disposed in meshing relationship with both the sun gear member 22 and the ring gear member 24.

The second planetary gear set 30 includes a sun gear member 32, a ring gear member 34, and a planet carrier assembly member 36. The planet carrier assembly member 36 includes a plurality of pinion gears 37 rotatably mounted on a carrier member 39 and disposed in meshing relationship with both the sun gear member 32 and the ring member 34.

The third planetary gear set 40 includes a sun gear member 42, a ring gear member 44, and a planet carrier assembly member 46. The planet carrier assembly member 46 includes a plurality of pinion gears 47, 48 rotatably mounted on a carrier member 49. The pinion gears 47 are disposed in meshing relationship with the sun gear member 42, and the pinion gears 48 are disposed in meshing relationship with the ring gear member 44. The ring gear member 34 is integral with the ring gear member 44. The third planetary gear set 40 is a compound planetary gear set.

The planetary gear arrangement also includes five torque transmitting mechanisms 50, 52, 54, 56 and 58. The torque transmitting mechanisms 50, 54, 56 are rotating type torque transmitting mechanisms, commonly termed clutches. Clutches 50, 54, and 56 are commonly multi-plate clutch devices, for example, in a friction launch configuration. The torque transmitting mechanism 52 is a stationary type torque transmitting mechanism, commonly termed brake or reaction clutch. The torque transmitting mechanism 58 is an SOWC.

The input shaft 17 is continuously connected with the ring gear member 24, and the output shaft 19 is continuously connected with the ring gear member 44. The planet carrier assembly member 26 is selectively connectable with the sun gear member 42 through the clutch 50. The sun gear member 32 is selectively connectable with the transmission housing 60 through the brake 52. The planet carrier assembly member 26 is selectively connectable with the sun gear member 32 through the clutch 54. The ring gear member 24 is selectively connectable with the planet carrier assembly member 46 through the clutch 56. The planet carrier assembly member 36 is selectively connectable with the transmission housing 60 through the braking one-way clutch 58.

FIG. 2 is an exemplary clutching table, describing operation of various clutches in an exemplary transmission to accomplish various transmission gear states, in accordance with the present disclosure. The torque transmitting mechanisms 50, 52, 54, 56 and 58 are selectively engaged in combinations of two to provide six forward speed ratios and a reverse speed ratio between the input shaft 17 and the output shaft 19.

The reverse speed ratio is established with the engagement of the clutch 54 and SOWC 58. The numerical value of this exemplary reverse speed ratio is 3.20. The clutch 54 is slipped for launching the vehicle in reverse.

The first forward speed ratio is established with the engagement of the clutch 50 and the SOWC 58. The numerical value of this exemplary first forward speed ratio is 4.06. The clutch 50 is slipped for launching the vehicle in the forward direction.

The second forward speed ratio is established with the engagement of the clutch 50 and the brake 52. The numerical value of this exemplary second forward speed ratio is 2.37.

The third forward speed ratio is established with the engagement of the brakes 50, 54. The numerical value of this exemplary third forward speed ratio is 1.55.

The fourth forward speed ratio is established with the engagement of the clutches 50, 56. The numerical value of this exemplary fourth forward speed ratio is 1.16.

The fifth forward speed ratio is established with the engagement of the clutches 54, 56. The numerical value of this exemplary fifth forward speed ratio is 0.85.

The sixth forward speed ratio is established with the engagement of the brake 52 and clutch 56. The numerical value of this exemplary sixth forward speed ratio is 0.67.

As set forth above, an exemplary engagement schedule or clutching schedule for torque transmitting mechanisms as illustrated in FIG. 1 is shown in the truth table of FIG. 2. Also, the chart of FIG. 2 describes the ratio steps that are attained utilizing sample tooth ratios (not shown). For example, the step ratio between the first and second forward speed ratios is 1.71, while the step ratio between the reverse and first forward ratio is −0.79. One having ordinary skill in the art will also appreciate that it can also be readily determined from the truth table of FIG. 2 that all of the single step forward ratio interchanges are of the single transition variety, as are the double step forward ratio interchanges.

FIG. 3 is a schematic partial cross-sectional view of an exemplary transmission utilizing an SOWC, in accordance with the present disclosure. As shown, the transmission 14 includes a transmission housing 60 enclosing planetary gear sets 30, 40 which rotate about a shaft 17. The position of the SOWC 58 is shown in FIG. 3. The outer race 70 of the SOWC 58 is splined to the spline 72 on the transmission housing 60. The inner race 74 of the SOWC 58 is splined to the planet carrier assembly member 36. A snap ring 76 keeps the SOWC 58 in place.

The SOWC 58 may be a controllable mechanical diode clutch or a selectable roller clutch design. The disclosure contemplates that other selectable (reversible) one-way clutches could be used as defined herein with the present disclosure.

An exemplary method is provided for controlling the position of a selector plate in a two mode SOWC using a hydraulically actuated piston and return spring mechanism that is an integral part of a valve body casting in a front wheel drive transmission.

In one exemplary arrangement of a front wheel drive automatic transmission, the valve body assembly is located to one side of the rotating torque elements and is aligned and secured to the transmission case with locating dowel pins and threaded fasteners. An additional cylindrical housing cast onto the inside surface of the inner portion of the valve body provides a bore containing a piston for the purpose of controlling the rotational movement of the selector plate, and hence, the operating modes of the SOWC. The centerline of the cylindrical bore feature is perpendicular to the axis of rotation of the transmission and is ideally located in the same plane as the selector plate's rotational arc. This enables a direct mechanical connection between the selector plate in the SOWC and the hydraulic control mechanism in the valve body.

The piston is in direct contact with a movable actuator plate. A feature on the actuator plate, in this case, a slot, aligns with and engages a selector lever fitted to the end of the selector plate lever arm on the SOWC to form an articulating connection between the SOWC and the hydraulic control mechanism. Other connection methods such as a fork engaging notches in a plate could also be employed. Hard stops designed into the piston bore of the control mechanism limit the axial travel of the actuator plate. The stops serve a dual function. First, they make attachment of the valve body to the transmission easier by facilitating alignment of the slot in the actuator plate with the selector lever on the SOWC. Secondly, they prevent the selector plate in the SOWC from becoming the hard stop for the return spring force when the SOWC is in a forward mode. In the reverse mode, they prevent the selector plate from becoming the hard stop for the piston apply force, thereby minimizing premature wear or damage to the SOWC.

An energy storage device, such as a compression or return spring, is contained in a guide housing also affixed to the inside surface of the inner portion of the valve body. The spring exerts a predetermined force on the actuator plate to bias it in a first position. Since the selector plate lever arm is engagingly connected to the actuator plate through the shift lever, the selector plate is held in the first angular position and the SOWC operates only in the disengaged mode as described above. The return spring force, however, must be sufficient to prevent viscous and frictional drag within the SOWC from unintentionally rotating the selector plate from its first angular position to the second angular position when the driving member is rotating in the second rotational, or freewheeling, direction.

Because the actuator plate is in contact with the bottom face of the piston, the return spring force also biases the piston towards the upper end of the piston bore. Pressurized automatic transmission fluid from a dedicated channel in the valve body is directed through an inlet port to the upper end of the piston bore. Ideally, the hydraulic fluid channels in the inner valve body portion are routed so the dedicated SOWC control channel passes directly under the upper end of the piston bore thus providing a conveniently short flow path.

When the transmission control algorithms command a mode change in the SOWC, pressurized hydraulic fluid enters the upper end of the piston bore via the dedicated channel. The piston moves to the bottom of the piston bore compressing the return spring and simultaneously moves the actuator plate to its second position. Since the selector plate lever arm is engagingly connected to the actuator plate through the shift lever, the selector plate is rotatably moved to the second angular position. The two mode SOWC thus operates in "reverse" mode, as described above.

Figure 4:
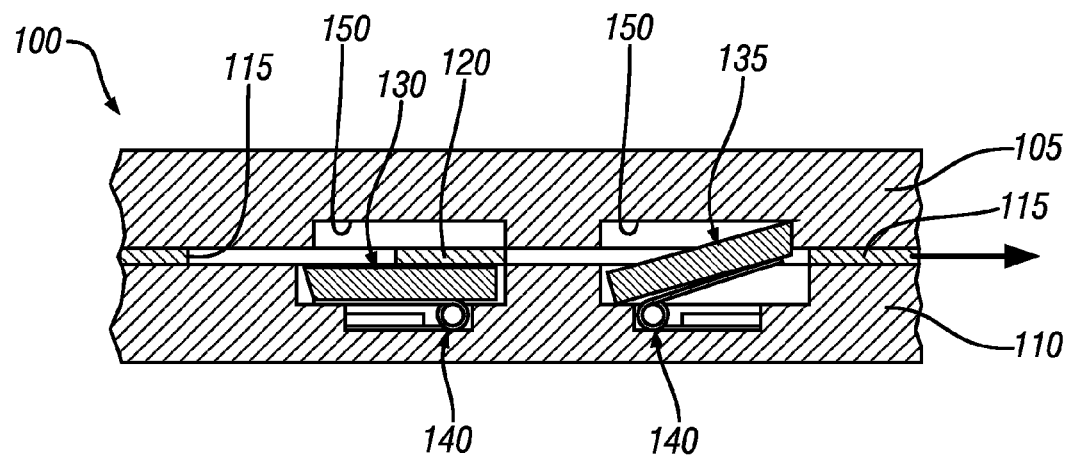
FIGS. 4 and 5 illustrate in cross-section an SOWC selecting between one-way operation and fully-locked operation, in accordance with the present disclosure.
Figure 5:
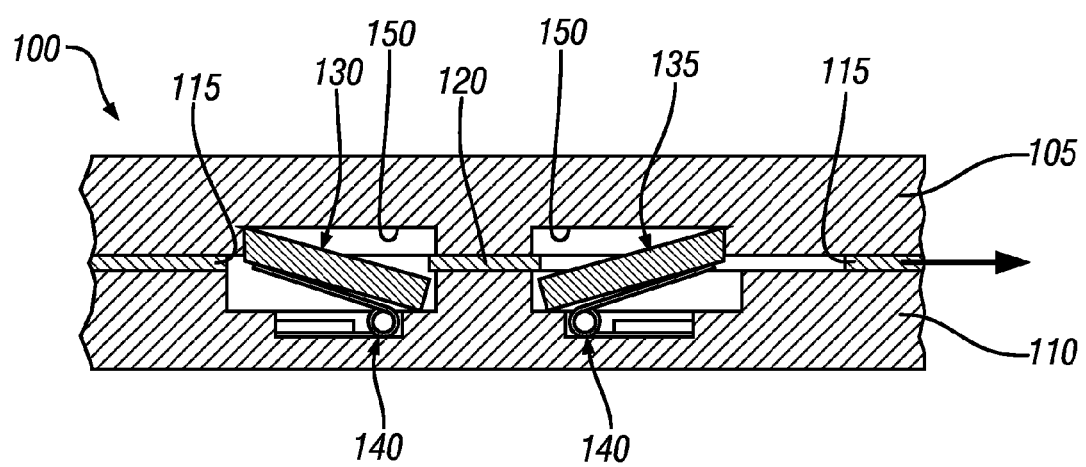

Several methods are known to implement an SOWC. Struts, rockers, rollers, or sprags are different features that can be utilized to selectively couple or decouple the members of the clutch. FIGS. 4 and 5 illustrate in cross-section an SOWC selecting between one-way operation and fully-locked operation, in accordance with the present disclosure. SOWC feature 100 comprises a first member 105, a second member 110, a selector plate 115, a selector plate actuation feature 120, a first engagement element 130, a second engagement element 135, two return springs 140, and two engagement features 150. First member 105, second member 110 and selector plate 115 can be rotatable features centered around a common axis of rotation (not shown). In the alternative, one of the members can be fixed, but still exposing a flat surface for the other member to rotate against. A preferable shape for members 105 and 110 are flat circular plates. Selector plate 115 is sandwiched between the two members and generally moves or remains fixed with second member 110. Selector plate 115 includes selector plate actuation feature 120. Selector plate 115 is movable relative to second member 110 by some small rotational angle, so as to provide calibrated movement of selector plate actuation feature 120. Engaging elements 130 and 135, illustrated as struts in this exemplary embodiment, are rotatingly located to second member 110, are oriented substantially normally to the radius of the members, and provide the selective coupling and decoupling functions served by the SOWC. Each engaging element, when in an up position, fixedly fit against an engagement feature 150 in first member 105 and prevent first member 105 from rotating relative to second member 110 in one direction. The engagement elements are normally in an up position due to forces exerted by return springs 140. Selector plate 115 can be actuated relative to the engaging elements, such that selector plate actuation feature 120 can be used to depress one of the engagement elements into a down position. The action of the engagement to stop relative rotation depends upon the geometry of the interacting features. In the present exemplary embodiment, if both engagement features are in an up position, then relative rotation of one member to the other is not possible. If one of the engagement features is in a down position, then the clutch can freewheel in the direction normally prohibited by the engagement feature now in the down position.

FIG. 4 illustrates SOWC feature 100 with one engagement element in a down position and one engagement element in an up position. Engagement element 135 is in an up position and is fit against an engagement feature 150. As a result, first member 105 cannot rotate to the left relative to second member 110. However, engagement element 130 is in a down position. Engagement element 135 provides substantially zero resistance to first member 105 rotating to the right relative to second member 110. When relative rotation occurs and first member 105 comes into contact with engagement element 135, pressure upon the top, nearly horizontal surface of engagement element 135 creates a downward rotation of engagement element 135. This ratcheting motion of engagement element 135 can continue as subsequent engagement features rotate past engagement element 135.

FIG. 5 illustrates SOWC feature 100 with both engagement elements in an up position. Selector plate 115 is actuated relative to the engagement elements such that neither engagement element is depressed. As a result, relative rotation of first member 105 and second member 110 is not possible. Each engagement element is fit against an engagement feature 150 and provides resistance against relative rotation in one direction.

It will be appreciated that the members of an SOWC are likely to have a plurality of features like SOWC feature 100, each actuated similarly to allow or prevent rotation in either direction, with the total torque transmitted through the SOWC distributed between the SOWC features. Similar SOWC features are known in the art for a rocker mechanism with a pair of engagement elements located at distal ends of the rocker, capable similarly of preventing or enabling relative rotation, in combination with engagement features on an opposing member, based upon rocking actuation of the rocker. Rollers or sprags can alternatively be used in members located one radially inside the other, with a gap between the members. The rollers or sprags can be actuated to interact within the gap to selectively couple the members in one or bother directions of rotation.

Application of an SOWC, as described above, to an automatic transmission can reduce parts and increase fuel efficiency. Yet, when the SOWC needs to be engaged, both ends of the SOWC need to spin at the same speeds. Slip across the clutch must substantially equal zero before the clutch is engaged.

When not engaged, the SOWC acts like a regular one-way clutch, being locked in first gear while free-wheeling in other gears. When engaged, the SOWC is locked in both directions, which can provides reverse gear and first gear engine braking. Once the SOWC is in an engaged mode, it can remain engaged so long as the speed and gear settings allow. An exemplary SOWC can remain in an engaged mode continuously through operation in parked, reverse, neutral, and first gear operation. For example, when a transmission shifts from park to reverse or to neutral, the SOWC stays engaged to prepare the reverse gear. If the transmission stays in the reverse gear, the SOWC remains engaged. When a driver shifts the transmission into drive, the SOWC can stay engaged until the vehicle picks up speed in excess of a threshold low speed range. Once disengaged, the SOWC remains disengaged to act as a regular one-way clutch so long as the vehicle remains above the threshold low speed range. A method to control the scheduling of engagement of an SOWC is disclosed.

Shifting into the engaged mode requires conditions of zero slip. Zero slip in the SOWC enabling a shift to the engaged mode can occur under various circumstances. One condition exists when the powertrain begins in a parked state with the transmission gearset in a static or zero speed condition. Under these conditions and in an indication that the engine is about to be started, the SOWC can be engaged immediately because slip of SOWC is zero.

Under operation in the disengaged mode, the SOWC can switch to the engaged mode once the vehicle speed drops into the threshold low speed range, allowing application of torque in the reverse direction consistent with engine braking. As mentioned above, shifting into engaged mode requires synchronization or a condition of zero slip in the clutch. Speed of the driving and driven members must be matched in order to enable a zero slip shift into the engaged mode. The speed of the driven member is dictated by the drivetrain and cannot be abruptly changed without affecting vehicle movement and drivability. Instead, a method is disclosed to match speeds in the SOWC by changing engine speed, for example, by applying electronic throttle control (ETC). The actual speeds of the driving member and the driven member within the transmission, in relation to the speed of the output shaft of the engine and the speed of the output shaft of the transmission, depends upon the particular configuration of the transmission. However, the speed of the transmission input shaft in relation to the speed of the transmission output shaft in an exemplary transmission with a fixed targeted gear ratio (GR) with no slip can be calculated by the following equation:

$$TransInputSpeed = GR * TransOutputSpeed \quad [1]$$

As described above, a torque converter is frequently utilized between the engine and the transmission. In a system utilizing a torque converter, speed of the engine output shaft to the speed of the transmission input shaft can be calculated by the following equation:

$$EngineOutputSpeed = TransInputSpeed + TCSlipSpeed \quad [2]$$

Torque converter slip speed is a function of the torque converter and the operation of the members. Predictions of torque converter slip may be developed experimentally, empirically, predictively, through modeling or other techniques adequate to accurately predict powertrain operation, and a multitude of prediction curves might be used for different conditions or operating ranges. Combination of Equations 1 and 2 yields the following equation:

$$EngineOutputSpeed = GR * TransOutputSpeed + TCSlipSpeed \quad [3]$$

By utilizing the gear ratio and torque converter slip properties, engine output speed and transmission output speed can be related to each other. Therefore, a known transmission output speed or a projection of output speed at some time calibrated at a shift completion point can be utilized to generate a target engine output speed useful to synchronize the members of the SOWC.

By calculating a target engine output speed, a command can be issued to the engine to quickly adjust the engine to achieve the desired speeds within the transmission. However, this target engine output speed can contain errors, both as a result of noisy data and due to changes in the transmission output shaft speed in the time period between the determination of the target engine output speed and the time that the engine responds to commands and reaches the commanded speed. Slip, tracked in the SOWC by direct or determines speeds of the SOWC members, can be used to determine and track a feedback error compensation value. This feedback error compensation value can be used to correct or augment the commands based upon the target engine output speed and guarantee SOWC slip reaches zero.

In one embodiment, as soon as the engine reaches a calculated zero slip condition, the SOWC is engaged and the ETC is dropped immediately. However, in order to ensure successful engagement, an alternative embodiment is disclosed wherein engine speed is driven slightly above a speed corresponding to zero slip and then is dropped gradually through a zone including zero slip. The speed increment above the speed corresponding to zero slip can be a fixed value or can be an adjustable value based upon test results, modeling or any other means sufficient to predict transmission operation and can be termed a calibrated speed increment. In this way, transient conditions or inaccurate measurements in shaft speeds do not cause failed SOWC engagements.

As described above, selection of the engaged mode is enabled only when the vehicle speed is within a threshold low speed range. If a driver shifts from drive back to neutral when vehicle speed is above the threshold low speed range, the SOWC stays disengaged until the speed falls below the threshold.

A rolling garage shift from drive to reverse is only allowed in first gear and when the vehicle speed is below a threshold creep speed, a speed at or below an upper limit of the threshold low speed range. If the vehicle speed is higher than the threshold creep speed, the transmission shifts to neutral and the SOWC remains disengaged until vehicle speed returns below the threshold creep speed. Once the vehicle speed drops below the threshold creep speed, then the SOWC can be engaged, and then the reverse clutch is enabled.

When the vehicle speed is within the threshold low speed range and transmission gear states allow, the SOWC can be selected between the disengaged mode and the engaged mode depending upon the operation of the vehicle. Transmission control logic, processing information regarding vehicle operator intention, including input from accelerator and brake pedal positions and vehicle speed, selectively commands SOWC mode based upon desired activation of engine braking or desired vehicle coasting. For example, if vehicle speed is below the threshold low speed range, and the vehicle operator abruptly releases the gas pedal, an intention to slow the vehicle can be assumed as an engine braking request. Accordingly, transmission control logic can command engine braking through the SOWC in response to an operator releasing the gas paddle when the vehicle is within the threshold low speed range. In one disclosed embodiment, in forward powered operation, the SOWC can only remain engaged in first gear. However, it is envisioned that in different gearset configurations, the SOWC can remain engaged to allow engine braking in additional gears, for example, in second gear, and the disclosure is not intended to be limited to the particular embodiments expressly described herein.

A vehicle operator, in addition to providing inputs through an accelerator pedal and a brake pedal, can indicate a desire to initiate engine braking by commanding the transmission in manual mode to the first gear. When a downshift to first gear is commanded and the vehicle speed is within the threshold low speed range, transmission logic initiates an engine braking request. As described above, the SOWC remains in a disengaged mode until vehicle speed is within the threshold low speed range. Once the engaged mode is enabled, transmission logic commands that slip across the SOWC be reduced to zero, then the SOWC is engaged, and then engine braking can occur.

Figure 6:
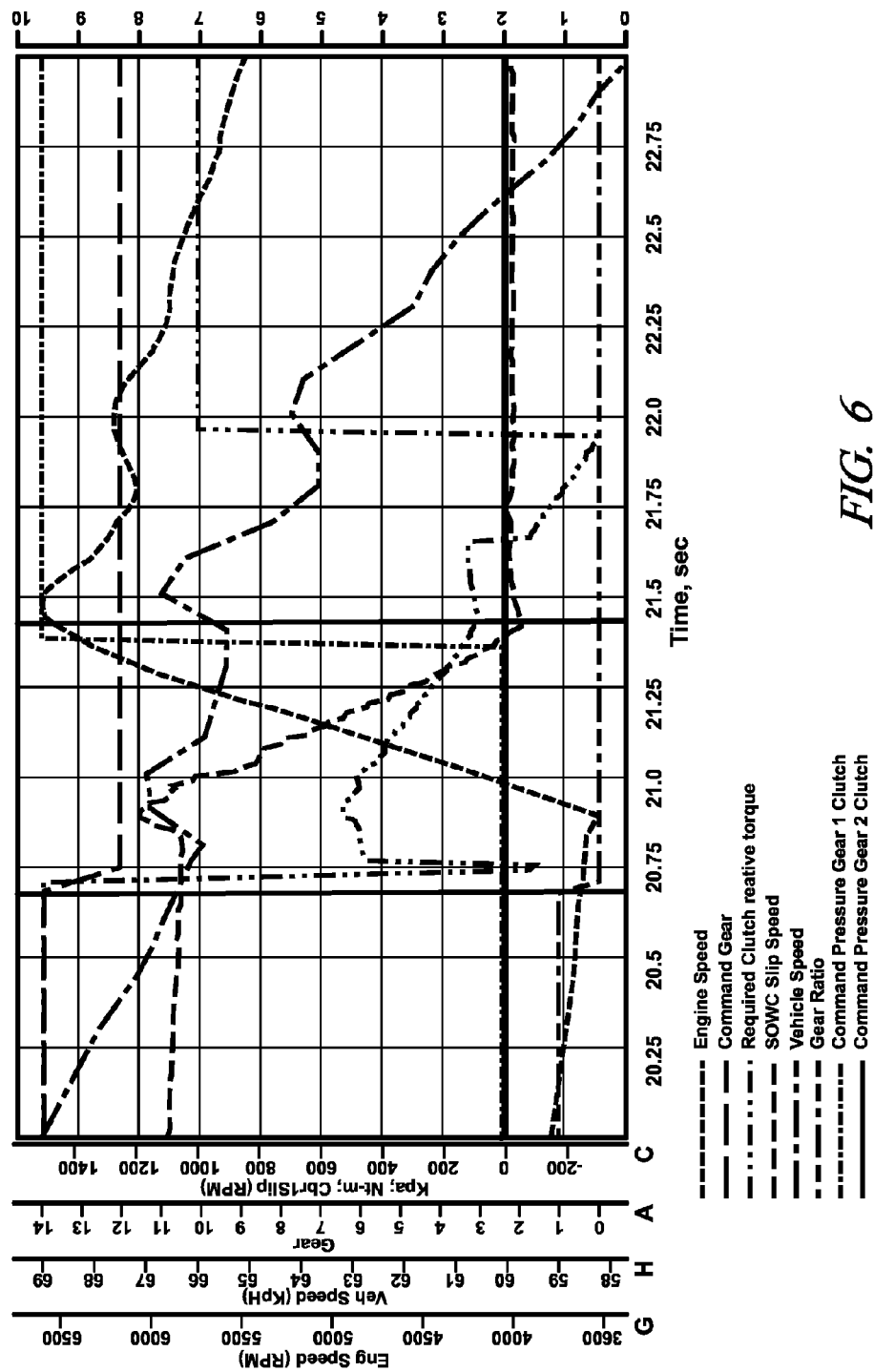
FIG. 6 graphically illustrates an exemplary engine braking event as commanded by a manual mode command to first gear, in accordance with the present disclosure.

FIG. 6 graphically illustrates an exemplary engine braking event as commanded by a manual mode command to first gear, in accordance with the present disclosure. A number of factors relevant to the operation of the vehicular powertrain through a braking event are plotted against a common timescale. A commanded gear described a requested transmission gear state. In the exemplary graph, the commanded gear begins in a second gear and is commanded at a time to a first gear, consistent with an operator manually selecting the transmission operate in a first gear through an exemplary PRNDL selector. A command pressure for a second gear enabling clutch, for example, a friction engagement clutch, is reduced from an initial operational level to zero. Required clutch reactive torque, describing reactive torque that was initially transmitted through all applied clutches in the second gear, simultaneously drops and progresses through a transition period during the shift. As described above, a condition of zero slip must be achieved to shift an SOWC to an engaged mode. SOWC slip begins at some initial non-zero value. Through the transition period, engine speed changes, for example through application of ETC, to some target speed enabling a zero slip shift. The engine changes required to match speeds within the SOWC cannot occur before the previously applied transmission clutch is disengaged, or the engine speed change would result in a perceptible change in vehicle motion. It should be noted that examples in the disclosure use a second gear as the previously applied transmission clutch. However, shifts to first gear for the purpose of engine braking or showing vehicle speeds accommodating an engagement of SOWC can originate from any forward gear. A slowing vehicle need not travel through all gears in preparation for a new vehicle speed. One exemplary method to time the initiation of changes in engine speed to accommodate the SOWC is to initiate the changes based upon disengagement of the previously applied clutch slip is reduced through the transition period to substantially zero and the SOWC can subsequently be engaged. At the end of the transition period, pressure in a first gear enabling clutch, for example, another friction engagement clutch, is transitioned from zero to some operational level. At some duration after the pressure in the first gear enabling clutch is commanded to the operational level, reactive torque is applied through the first gear enabling clutch, and vehicle speed and engine speed are reduced through engine braking.

Figure 7:
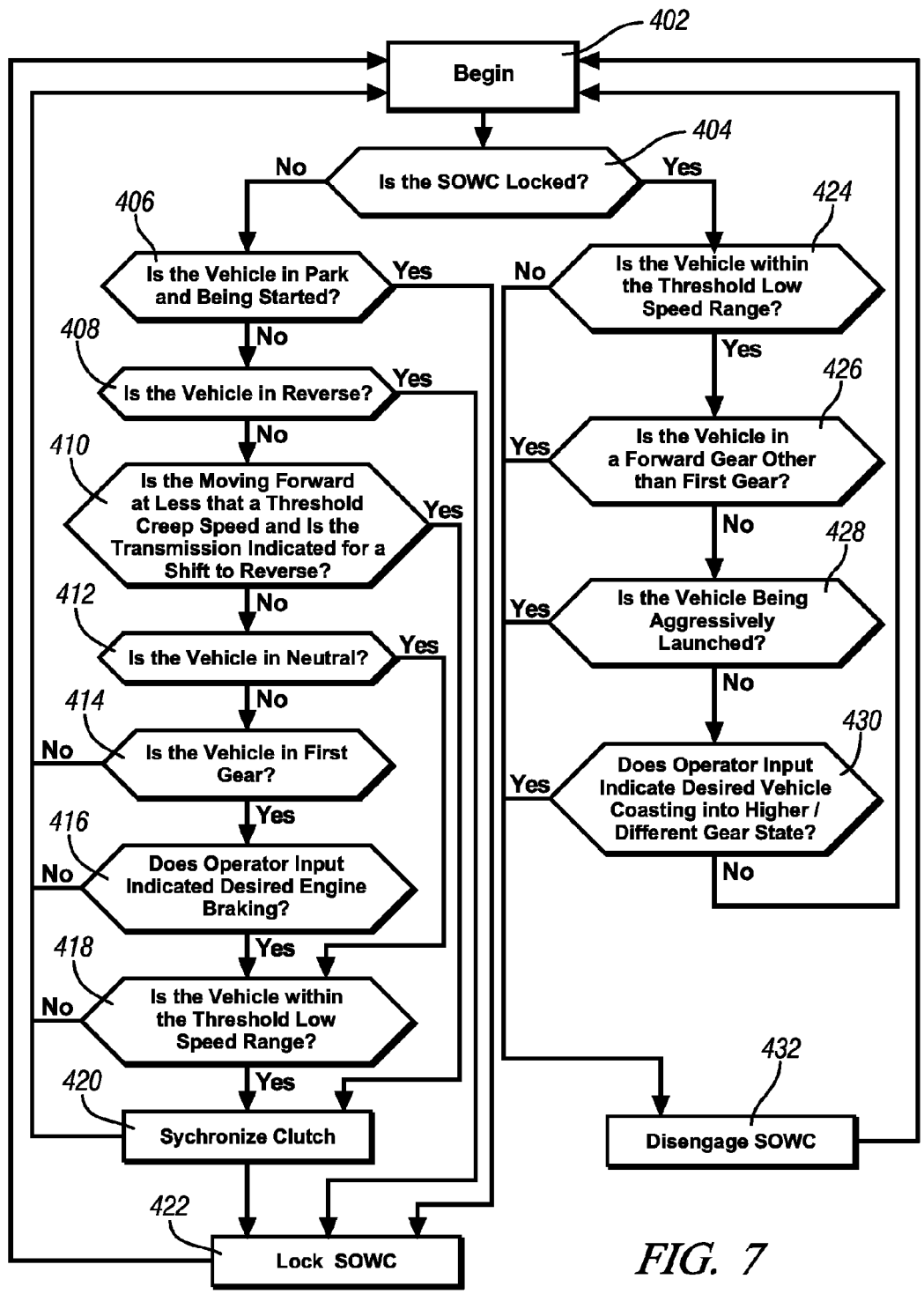
FIG. 7 illustrates a flowchart describing an exemplary process through which SOWC engagement and disengagement can be managed, in accordance with the present disclosure.

FIG. 7 illustrates a flowchart describing an exemplary process through which SOWC engagement and disengagement can be managed, in accordance with the present disclosure. Process 400 begins in block 402. At block 404, the SOWC locked status is determined. If the SOWC is not locked, then the process proceeds to block 406. If the SOWC is locked, then the process proceeds to block 424. At block 406, a determination is made whether the vehicle is in park and being started. If these conditions are met, then the process proceeds to block 422, and the SOWC is locked. If these conditions are not met, then the process proceeds to block 408. At block 408, a determination is made whether the vehicle is in reverse. If this condition is met, then the process proceeds to block 422, and the SOWC is locked. If this condition is not met, then the process proceeds to block 410. At block 410, a determination is made whether the vehicle is moving forward at less than a threshold creep speed and the transmission is indicated for a shift to reverse. If these conditions are met, then the process proceeds to block 420, and the clutch is synchronized in preparation for being locked. If these conditions are not met, then the process proceeds to block 412. At block 412, a determination is made whether the vehicle is in neutral. If this condition is met, then the process proceeds to block 418. If this condition is not met, then the process proceeds to block 414. At block 414, a determination is made whether the vehicle is in first gear. If this condition is met, then the process proceeds to block 416. If this condition is not met, then the process returns to block 402. At block 416, a determination is made whether the operator input indicates desired engine braking. If this condition is met, then the process proceeds to block 418. If this condition is not met, then the process returns to block 402. At block 418, a determination is made whether the vehicle is within the threshold low speed range. If this condition is met, then the process proceeds to block 420, and the clutch is synchronized in preparation for being locked. If this condition is not met, then the process returns to block 402. Block 420 includes actions to synchronize the SOWC, in accordance with methods described herein. Block 422 includes locking the SOWC, in accordance with methods described herein. At block 424, a determination is made whether the vehicle is within the threshold low speed range. If this condition is met, then the process proceeds to block 426. If this condition is not met, then the process proceeds to block 432, wherein the SOWC is disengaged, in accordance with methods described herein. At block 426, a determination is made whether the vehicle is in a forward gear other than the first gear. If this condition is not met, then the process proceeds to block 428. If this condition is met, then the process proceeds to block 432, wherein the SOWC is disengaged, in accordance with methods described herein. At block 428, a determination is made whether the vehicle is being aggressively launched. If this condition is not met, then the process proceeds to block 430. If this condition is met, then the process proceeds to block 432, wherein the SOWC is disengaged, in accordance with methods described herein. At block 430, a determination is made whether operator input indicates desire vehicle coasting into a higher/different gear state. If this condition is not met, then the process returns to block 402. If this condition is met, then the process proceeds to block 432, wherein the SOWC is disengaged, in accordance with methods described herein. As described in process 400 by return lines to block 402, the process is intended to be repeated continually or in a loop in cycles according to the particulars of the control module or modules utilized.

Figure 8:
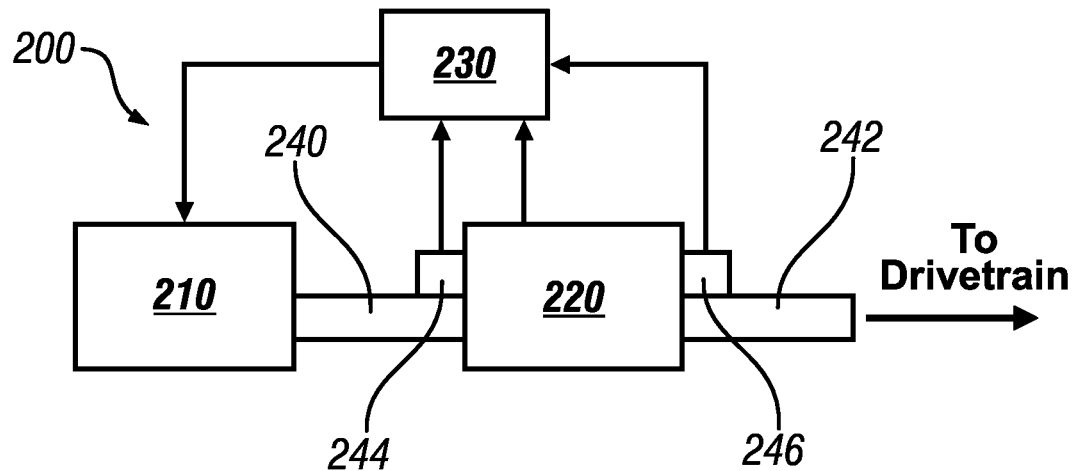
FIG. 8 schematically illustrates an exemplary powertrain including a control system employing ETC, in accordance with the present disclosure.

FIG. 8 schematically illustrates an exemplary powertrain including a control system employing ETC, in accordance with the present disclosure. Powertrain 200 comprises an engine 210, a transmission 220, and a control system 230. Engine 210 provides torque to transmission 220 through engine output shaft 240. Transmission 220 transforms the torque from the engine to an output torque and provides the output torque to a drivetrain (not shown) via transmission output shaft 242. Control system 230 includes an electronic module monitoring speeds of shafts 240 and 242, performing determinations in support of transitioning an SOWC from a disengaged state to an engaged state according to the methods provided herein, and providing ETC commands to the engine for the purpose of creating a condition of zero slip in the SOWC. A rotational speed sensor 244 is located proximately to shaft 240 for the purpose of measuring a rotational velocity of the shaft. Another rotational sensor 246 is located proximately to shaft 242 for the purpose of measuring rotational velocity of that shaft. Rotational speed sensors 244 and 246 are devices well known in the art utilizing magnetic, visual, or other known methods to quantify rotational speed in a spinning shaft. As described above, a target speed for the engine for use in matching speeds of the members within the SOWC can be developed by multiplying the speed of shaft 242 by a gear factor associated with the target first gear and commanded to the engine through ETC. Once the target speed has been approximated and the engine speed has been adjusted based upon the target speed, a feedback term can be utilized based upon calculated slip, derived from rotational speed sensors 244 and 246, in order to drive the engine speed accurately to create the zero slip condition. Once zero slip has been achieved, the SOWC can be engaged, a signal sent to control system 230, and the ETC can be dropped to allow normal control of the engine.

Feedback of slip speed can additionally be used to evaluate attempts to engage the SOWC. In the event that slip cannot be controlled to zero, for example, if the engine approaches a maximum engine speed limit, the engine braking request can be cancelled or overridden and control of the engine returned to normal parameters.

The engaged mode is intended for use in low speeds. When an operator aggressively launches the vehicle with gas paddle input when the SOWC is engaged, the SOWC immediately ceases any reverse loading and disengages. This disengagement clears the transmission to accelerate the vehicle through successive gears outside of the intended slow operation of the engaged mode.

Engine braking applies a reverse torque upon the drivetrain by maintaining a coupled connection between the drivetrain and the engine in an underpowered state. Losses in the engine including pumping forces in the engine act as a slowing factor upon the vehicle. However, in an example such as a downhill slope, forces tending to increase the speed of vehicle can cause the vehicle to gain speed despite the engaged SOWC. Also the operator can also demand to stay in low gear in higher vehicle speeds with engine braking and then request higher gear. As a result, engine speed can exceed the threshold low speed range in which SOWC engagement is preferred, vehicle speed can enter ranges in which the transmission shift strategy will prefer higher transmission gear states, and the operator, perceiving the higher speed, can remove the first gear command in order to allow the transmission to enter higher states. While the vehicle is moving at a higher speed in this scenario, the balance of torque between the still underpowered engine and the drivetrain can still sustain a reverse torque through the SOWC. Referring back to FIGS. 4 and 5, one with skill in the art will appreciate that a force applied against an engagement element in an up position and transmitting torque between the clutch members can create a locked condition, in which separator plate 115 cannot return the engagement element to a down position. A method is disclosed to disengage an engaged SOWC that is initially transmitting torque in the reverse direction.

As described in methods above, an ETC can be utilized to command a change to speed of an engine for purposes of creating zero slip in a previously disengaged SOWC. A similar method can be utilized to remove reverse torque in an engaged SOWC for the purpose of enabling disengagement of the SOWC by commanding increased torque from the engine resulting in increased engine speed. Torque being transmitted through the SOWC is not measured directly. In a vehicle traveling at some speed, the balance of forces acting upon the vehicle in an engaged SOWC can result in either a forward or reverse torque upon the SOWC, and the engaged SOWC will not measurably slip or rotate as a result of the direction of the torque. However, in a vehicle equipped with a torque converter between the engine and the transmission, the direction of torque applied between the engine and the transmission is apparent in the relative motion of the two members within the torque converter.

Figure 9:
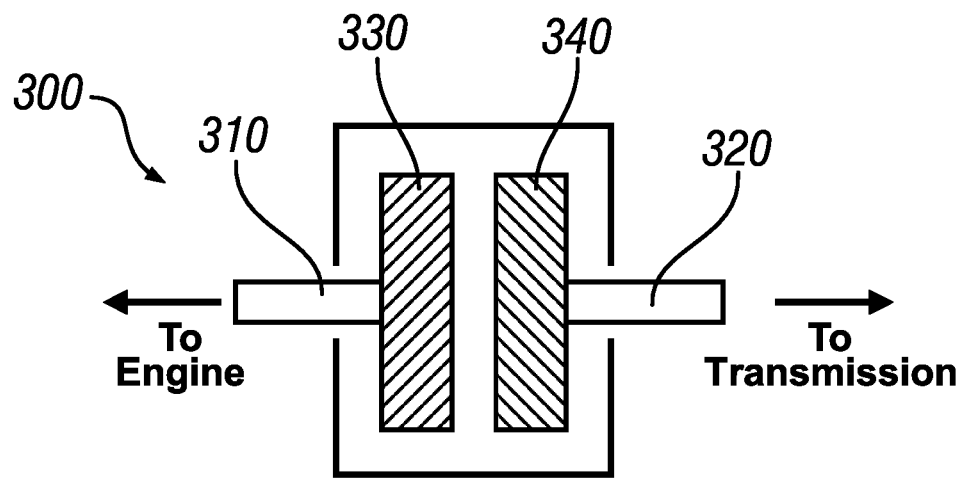
FIG. 9 schematically illustrates an exemplary torque converter, in accordance with the present disclosure.

FIG. 9 schematically illustrates an exemplary torque converter, in accordance with the present disclosure. Torque converter 300 comprises an engine to torque converter shaft 310, a torque converter to transmission shaft 320, a pump mechanism 330, and a turbine mechanism 340. Torque is transmitted through torque converter 300 between the engine and the transmission. Shaft 310 and shaft 320 are not physically connected, but rather pump mechanism 330 and turbine mechanism 340 react with each other through a fluidic medium contained within torque converter 300. Pump mechanism 330 is known to include fluidic channeling blades which, when the mechanism is turned, create motion in the fluid. The moving fluid interacts and creates a viscous force upon turbine mechanism 340, causing motion in a same direction in which pump mechanism 330 is moving. Movement in turbine 340, likewise, acts in the reverse, moving the fluid within torque converter 300 and causing movement in pump mechanism 330. Motion in either mechanism causes sympathetic motion in the other mechanism. As described above, sensors can be utilized to measure a rotational speed of a shaft. Sensors can be located proximately to shaft 310 and 320, and relative rotational speed of the shafts can be determined in comparison. By analyzing the relative motion of engine to torque converter shaft 310 and torque converter to transmission shaft 320 in combination with known viscous properties of the torque converter, a net reactive torque transmitted through the torque converter can be estimated. This net reactive torque through the torque converter can be used to describe direction and magnitude of torque applied to the SOWC, diagnose a locked condition in the SOWC preventing a disengagement from the engaged mode, and estimate a increase in engine torque necessary to overcome the torque applied to the SOWC.

A pump mechanism turning faster than a turbine mechanism describes a transmission receiving torque in a positive direction from the engine. An exemplary method diagnoses a locked SOWC condition; utilizes engine commands, such as can be given through ETC, to increase engine torque and thereby increase engine speed until a relative rotational speed in the torque converter exceeding some minimum relative rotational speed threshold is measured, the threshold calibrated to resolve or overcome the locked SOWC condition; commands an SOWC disengagement; and then drops engine commands based upon the locked SOWC diagnosis. An exemplary minimum relative rotational speed threshold can be 20 to 30 revolutions per minute in the rotational direction opposite of engine braking.

Commands to increase torque from the engine in order to enable the disengagement of the SOWC can take the form of different exemplary embodiments. For example, a torque increase calibrated to the relative rotational speed measured across the torque converter can be utilized according to a lookup table or a model sufficient to predict the operation of the powertrain. In another example, the torque from the engine can be incrementally stepped up in a series of increases or in a gradual increase until the disengagement is enabled or a particular relative rotational speed is achieved. In another example, the torque can be increased in a profile calibrated according to SOWC and engine behavior. In another example, information external to the vehicle, such as slope or terrain information made available through analysis of 3D map or GPS data known in the art or driving pattern or habit analysis can be utilized to predictively prevent entry into an SOWC engaged mode, predictively disengage the SOWC before the vehicle increases in speed, or otherwise modulate the increase in engine torque based upon known properties, such as the vehicle reaching the bottom of a hill.

Figure 10:
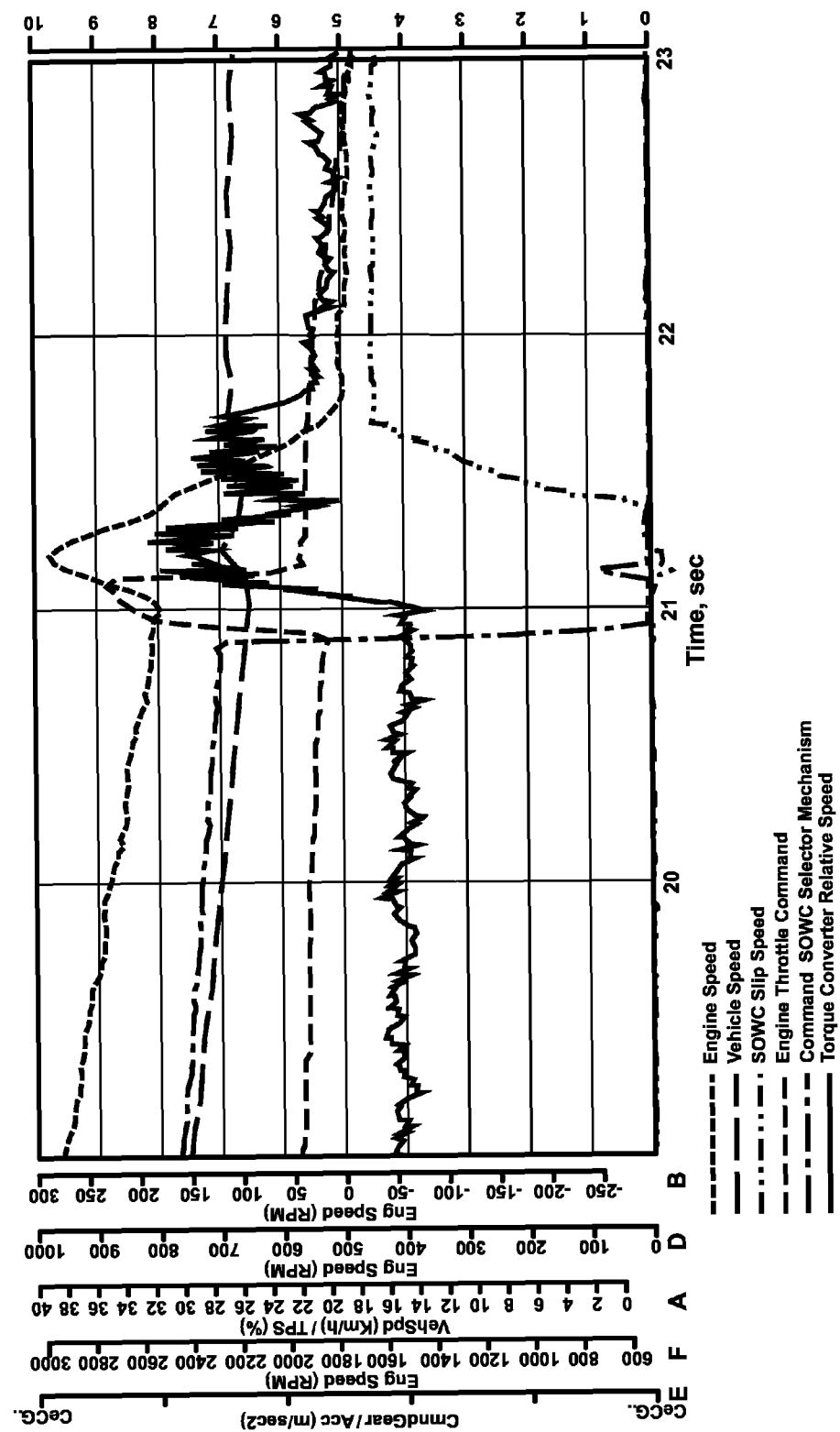
FIG. 10 graphically illustrates exemplary control of an engine to facilitate an SOWC disengagement, in accordance with the present disclosure.

FIG. 10 graphically illustrates exemplary control of an engine to facilitate an SOWC disengagement, in accordance with the present disclosure. Data tracks depicted in FIG. 10 are similar to data tracks depicted in FIG. 6, except that the transmission exemplified in the data of FIG. 10 receives a command to upshift from a gear wherein an SOWC is engaged to a higher gear wherein the SOWC must be disengaged. A change in command gear is depicted from some initial gear to a higher gear in accordance with a transmission control strategy reacting to vehicle conditions. In accordance with the shift command, command to the SOWC selector mechanism is adjusted. As described above, a condition can occur wherein an engaged SOWC can become locked based upon an engine braking load, such that despite a change in command to the SOWC to disengage, the SOWC can remain locked. Upon initiation of the shift, SOWC slip should increase, indicating successful disengagement of the SOWC and freewheeling in accordance with operation in higher gears. Instead, a locked SOWC condition is diagnosed according to methods described herein, for example, through analysis of the torque converter relative speed as depicted in FIG. 10. The negative relative speed of the torque converter of at least a calibrated magnitude allows an assumption to be made that the SOWC is in a locked condition. In response, increased engine speed is commanded, such as through ETC, as described above, the engine speed increases, and the resulting load upon on the SOWC is reduced such that disengagement can occur. In the exemplary process of FIG. 10, the increase to engine throttle command is terminated once the torque converter relative speed exceeds a value of positive forty. As will be appreciated by one having ordinary skill in the art, the response of the engine lag some interval behind the change to the engine throttle commands. In the alternative to utilizing torque converter relative speed to end the increase throttle command to the engine, the level of engine speed increase can be calibrated according to the measured transmission output speed, can be continued and controlled according to measured slip, or a continuous or repeating command to disengage the SOWC can be generated and the increase stopped when successful disengagement is detected. However, adjusting to measured torque converter slip is preferable to these other methods in that the relative speed of the torque converter allows a direct evaluation of the torque acting upon the SOWC and the likely locked condition of the SOWC, rather than inferring the necessary engine speed required to resolved the locked condition from behavior of the powertrain. FIG. 10 shows an increase in engine speed to a peak value, subsequent reduction of engine speed, and an increase in SOWC slip in accordance with successful disengagement.

Engine control such as ETC discussed above is controlled by an engine control module (ECM) as part of an overall control system. Similarly, transmission control is accomplished within a transmission control module (TCM) as part of the overall control system. In overall operation, the control system is operable to synthesize operator inputs, ambient conditions, engine operating parameters, and combustion performance measurements, and execute algorithms to control various actuators to achieve targets for control parameters, including such parameters as fuel economy, emissions, performance, and drivability. The control system is operably connected to a plurality of devices through which an operator controls or directs operation of the engine. Exemplary operator inputs include an accelerator pedal, a brake pedal, transmission gear selector, and vehicle speed cruise control when the engine is employed in a vehicle. The control system may communicate with other controllers, sensors, and actuators via a local area network ('LAN') bus or control area network ('CAN') (not shown) which preferably allows for structured communication of control parameters and commands between various controllers.

The control system is operably connected to the engine and the transmission, and functions to acquire parametric data from sensors, and control a variety of actuators of the engine over appropriate interfaces. The control system receives an engine torque command, and generates a desired torque output, based upon the operator inputs. Exemplary engine operating parameters that are sensed by control system using the aforementioned sensors include engine coolant temperature, crankshaft rotational speed ('RPM') and position, manifold absolute pressure, ambient air flow and temperature, and ambient air pressure. A sensor capable of monitoring crankshaft rotational position can be utilized to monitor or determine a progression of the engine and various cylinders through various stages of a combustion cycle. Combustion performance measurements may comprise measured and inferred combustion parameters, including air/fuel ratio, location of peak combustion pressure, among others. Various speed sensors are located throughout the transmission to measure and estimate speeds of different members within the transmission.

The control system preferably comprises a general-purpose digital computer generally including a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, comprising resident program instructions and calibrations stored in ROM and executed to provide the respective functions of each computer.

Algorithms for engine control may be executed during preset loop. Algorithms stored in the non-volatile memory devices are executed by the central processing unit and are operable to monitor inputs from the sensing devices and execute control and diagnostic routines to control operation of the engine, using preset calibrations. Loop cycles may be executed at regular intervals, for example each 3.125, 6.25, 12.5, 25 and 100 milliseconds during ongoing engine operation. Alternatively, algorithms may be executed in response to occurrence of an event or interrupt request.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling a powertrain in a vehicle comprising an electro-mechanical transmission including a frictionless engagement selectable one-way clutch mechanically-operatively coupled to an internal combustion engine adapted to selectively transmit mechanical power between an output member and a torque converter, said method comprising:

monitoring engagement status of said selectable one-way clutch;

monitoring an upshift command;

monitoring a speed of an engine to torque converter shaft;

monitoring a speed of a torque converter to transmission shaft;

when said monitoring detects engagement of said selectable one-way clutch and said upshift command, determining a relative rotational speed of said torque converter based upon said speed of said engine to torque converter shaft and said speed of said torque converter to transmission shaft;

diagnosing if a locked selectable one-way clutch condition is present based upon said relative rotational speed;

commanding a torque increase from said engine based upon said locked selectable one-way clutch condition; and commanding disengagement of said selectable one-way clutch.

2. The method of claim 1 wherein commanding a torque increase from said engine comprises:
commanding an incremented step up in a series of increases of torque from said engine.

3. The method of claim 1 wherein commanding a torque increase from said engine comprises:
commanding a gradually increasing torque from said engine.

4. The method of claim 1 wherein commanding a torque increase from said engine comprises:
monitoring GPS data to determine a current position of the vehicle;
comparing the current position of the vehicle to a three-dimensional map data to determine roadway slope conditions; and
if the roadway slope conditions predict an increased vehicle speed, increasing the commanded torque from said engine to prevent a reverse torque through the selectable one-way clutch as a result of the predicted increased vehicle speed.

5. The method of claim 1 wherein commanding a torque increase from said engine comprises:
commanding a gradually increasing torque from said engine until said relative rotational speed exceeds a minimum relative rotational speed threshold.

6. The method of claim 1, further comprising:
after said commanding said torque increase from said engine, comparing said relative rotational speed to a minimum relative rotational speed threshold; and
wherein said commanding disengagement of said selectable one-way clutch is initiated based upon said comparing said relative rotational speed to said minimum relative rotational speed threshold.

7. The method of claim 1, wherein said diagnosing said locked selectable one-way clutch condition based upon said relative rotational speed comprises:
diagnosing said locked selectable one-way clutch condition if said speed of said torque converter to transmission shaft is greater than said speed of said engine to torque converter shaft.

8. The method of claim 1, wherein said diagnosing said locked selectable one-way clutch condition based upon said relative rotational speed comprises:
diagnosing said locked selectable one-way clutch condition if said relative rotational speed indicates a torque applied to said selectable one-way clutch is likely to cause said locked selectable one-way clutch condition.

9. Method for controlling a powertrain in a vehicle comprising an electro-mechanical transmission including a frictionless engagement selectable one-way clutch mechanically-operatively coupled to an internal combustion engine adapted to selectively transmit mechanical power between an output member and a torque converter, said method comprising:
operating said selectable one-way clutch through an engine braking event;
monitoring a speed of an engine to torque converter shaft;
monitoring a speed of a torque converter to transmission shaft;
monitoring a relative rotational speed of said torque converter based upon said speed of said engine to torque converter shaft and said speed of said torque converter to transmission shaft;
monitoring a command to end said engine braking event;
when said monitoring detects said command to end said engine braking event, diagnosing if a locked selectable one-way clutch condition is present based upon said relative rotational speed;
commanding said engine to increase speed to a speed resolving said locked selectable one-way clutch condition; and
commanding disengagement of said selectable one-way clutch.

10. The method of claim 9 wherein commanding said engine to increase speed comprises:
commanding a gradually increasing engine speed until said relative rotational speed of said torque converter exceeds a minimum relative rotational speed threshold, said relative rotational speed of said torque converter based upon said speed of said engine to torque converter shaft and said speed of said torque converter to transmission shaft.

11. Apparatus for controlling a powertrain in a vehicle comprising an electro-mechanical transmission including a frictionless engagement selectable one-way clutch mechanically-operatively coupled to an internal combustion engine adapted to selectively transmit mechanical power between an output member and a torque converter, said apparatus comprising:
a sensor monitoring a rotational speed of a torque converter pump;
a sensor monitoring a rotational speed of a torque converter turbine;
a control system configured to:
monitor said rotational speed of said torque converter pump;
monitor said rotational speed of said torque converter turbine;
monitor a transmission status including a command to upshift from an engaged selectable one-way clutch gear state;
determine if a locked selectable one-way clutch condition is present based upon said rotational speed of said torque converter pump and said rotational speed of said torque converter turbine;
command a speed of said engine sufficient to overcome said locked selectable one-way clutch condition; and
command said selectable one-way clutch to disengage.

12. The apparatus of claim 11, wherein said control system configured to command said speed of said engine sufficient to overcome said locked selectable one-way clutch condition comprises:
said control system configured to command a gradually increasing engine speed until said rotational speed of a torque converter pump exceeds said rotational speed of said torque converter turbine by a minimum relative rotational speed threshold.

* * * * *